Figure 1:
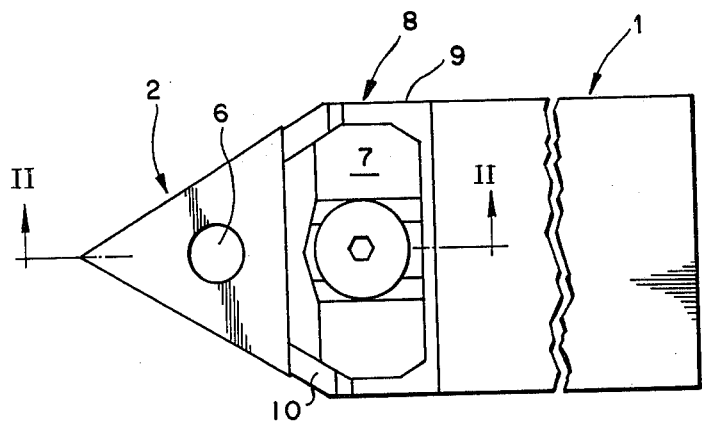

United States Patent [19]

Nessel

[11] 4,334,807
[45] Jun. 15, 1982

[54] TOOL HOLDER

[75] Inventor: Eliezer Nessel, Haifa, Israel

[73] Assignee: Iscar Ltd., Nahariya, Israel

[21] Appl. No.: 183,876

[22] Filed: Sep. 4, 1980

[30] Foreign Application Priority Data

Oct. 3, 1979 [IL] Israel ........................................ 58378

[51] Int. Cl.³ .............................................. B26D 1/12
[52] U.S. Cl. ................................................... 407/103
[58] Field of Search ......................................... 407/103

[56] References Cited

U.S. PATENT DOCUMENTS

| | | | |
|---|---|---|---|
| 3,176,377 | 4/1965 | Milewski | 407/103 |
| 3,192,602 | 7/1965 | Copeland | 407/103 |
| 3,192,603 | 7/1965 | Greenleaf | 407/103 |
| 3,408,721 | 11/1968 | Berry, Jr. | 407/103 |
| 3,488,823 | 1/1970 | Wirfelt | 407/103 |
| 3,545,060 | 12/1970 | Kezran | 407/103 |
| 3,905,081 | 9/1975 | Wirfelt | 407/103 |

Primary Examiner—Harrison L. Hinson
Attorney, Agent, or Firm—Ladas & Parry

[57] ABSTRACT

A tool holder for a cutting insert comprising, an insert receiving base member; a locating pin projecting out of the base member so as to extend through a central bore formed in the insert when the latter is located on the base member; a clamping member juxtaposed with respect to the base member so as to be supported by a support zone of the tool holder; a first support surface of the support zone located substantially parallel to the base member; a second wedging surface of the support zone; an elongated recessed portion between the base member and the first surface and into which the wedging surface slopes towards the base member; a rearwardly disposed elongated heel portion of the clamping portion; a forwardly disposed nose portion of the clamping member; a curved abutting surface of the nose portion; an elongated tail portion formed integrally with the nose portion so as to project into the recessed portion in abutting relationship with the wedging surface; and screw biasing means located intermediate said heel portion and said nose portion for screw biasing the clamping member towards the support zone with the heel portion in sliding engagement with the first support surface, with the tail portion in abutting engagement with the wedging surface and with the curved abutting surface adapted to be in a clamping abutting engagement with an edge surface of the insert remote from a cutting portion thereof when the latter is located on the base member.

4 Claims, 4 Drawing Figures

TOOL HOLDER

This invention relates to a tool holder for a cutting insert, preferably of the indexable kind having a central bore through which extends a locating pin projecting out of the tool holder, the tool holder being provided with a clamping member and screw biasing means for screw biasing the clamping member to the tool holder so as to abut an edge surface of the insert remote from a cutting portion thereof and thereby to clamp the insert against the pin.

Known tool holders of this kind are for example disclosed in U.S. Pat. Nos. 3,488,823 and 3,905,081. Tool holders of this known kind are effective in clamping the insert with respect to rotational displacement about the pin and vis-a-vis possible upward displacement of the rear portion of the insert. The clamping of the insert vis-a-vis possible upward displacement of its front portion is ensured by the generation of a fixed clamping couple.

It has been found in practice that, owing to the manufacturing tolerances of the inserts the clamping engagement of the clamping member with the edge surface of the insert takes place at differing locations and in particular at differing heights above the insert supporting surface of the tool. These variations give rise to variations in the magnitude of the clamping couple in accordance with the manufacturing tolerances of the inserts and, in consequence the clamping reliability vis-a-vis possible upward displacement of the insert front portion may vary from insert to insert.

It is an object of the present invention to provide a new and improved tool holder for a cutting insert in which the above referred to variations in clamping reliability are substantially reduced.

According to the present invention there is provided a tool holder for a cutting insert comprising, an insert receiving base member; a locating pin projecting out of the base member so as to extend through a central bore formed in the insert when the latter is located on the base member; a clamping member juxtaposed with respect to the base member so as to be supported by a support zone of the tool holder, a first support surface of the support zone located substantially parallel to the base member; a second wedging surface of the support zone; an elongated recessed portion between the base member and the first surface and into which the wedging surface slopes towards the base member; a rearwardly disposed elongated heel portion of the clamping portion; a forwardly disposed nose portion of the clamping member; a curved abutting surface of the nose portion; an elongated tail portion formed integrally with the nose portion so as to project into the recessed portion in abutting relationship with the wedging surface; and screw biasing means located intermediate said heel portion and said nose portion for screw biasing the clamping member towards the support zone with the heel portion in sliding engagement with the first support surface, with the tail portion in abutting engagement with the wedging surface and with the curved abutting surface adapted to be in a clamping abutting engagement with an edge surface of the insert remote from a cutting portion thereof when the latter is located on the base member. Preferably said curved abutting surface has a curvature substantially defined by the relationship $R = C\phi$ where R is the radius vector measured between the heel portion and any point of the curved abutting surface, $\phi$ is the angle between the radius vector and said first support surface and C is a constant.

With such a tool holder, and by virtue of the form of the curved abutting surface with respect to the heel portion, it is ensured that the abutting surface clampingly engages the edge surface of the insert substantially at a constant height above the base member irrespective of the manufacturing tolerances of the insert, i.e. irrespective of the distance between the pin and the edge surface. In this way the magnitude of the clamping couple acting on the insert is maintained substantially constant and the clamping reliability of the tool does not vary substantially from insert to insert.

Figure 2:
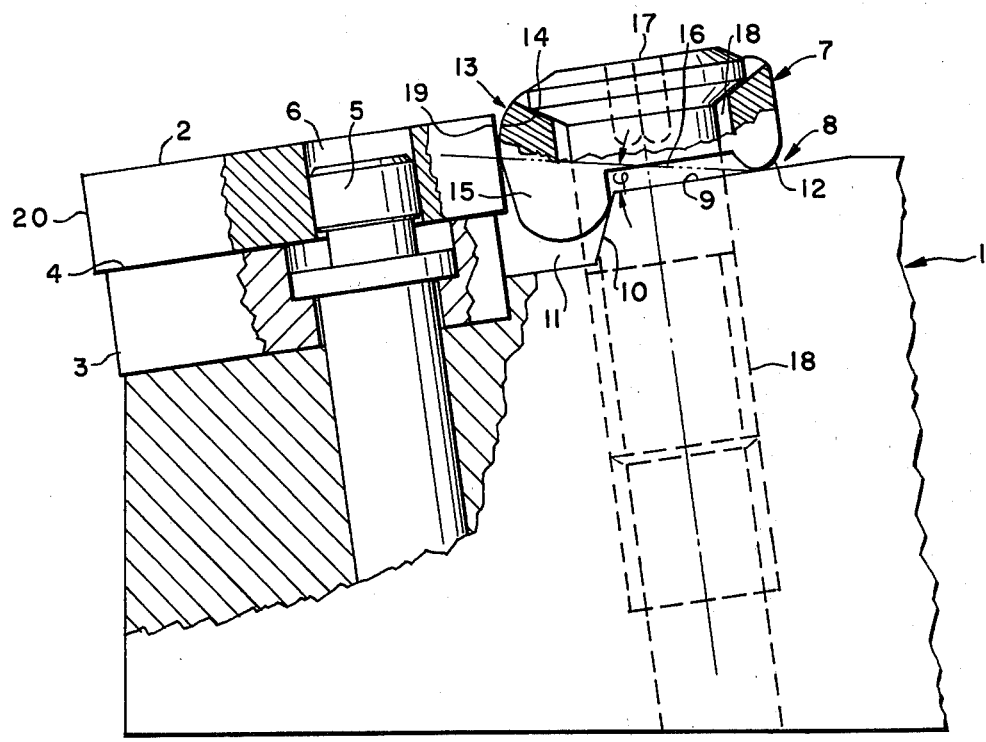
Figure 3:
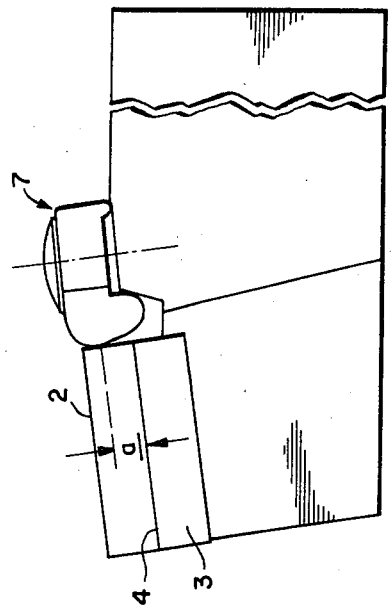
Figure 4:
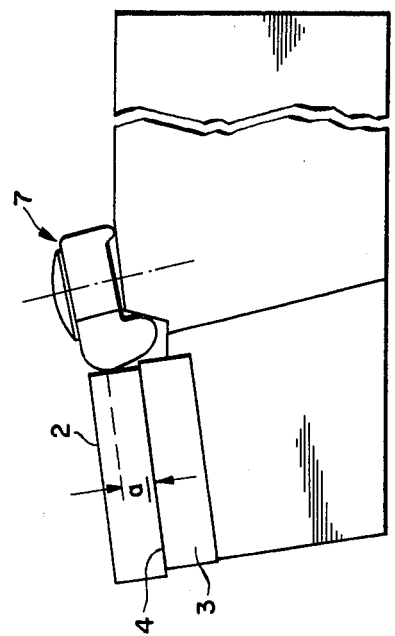

One embodiment of a clamping tool in accordance with the present invention will now be described by way of example and with reference to the accompanying drawings in which:

FIG. 1 is a plan view, from above of a tool holder in accordance with the present invention together with a cutting insert, FIG. 2 is a cross-sectional view on an enlarged scale, of the tool holder and insert shown in FIG. 1 taken along line II—II, and FIGS. 3 and 4 are schematic side elevations of the tool holder showing its use in clamping inserts of slightly differing dimensions.

As seen in FIGS. 1 and 2 of the drawings a tool holder 1 is designed to receive and clampingly retain an indexable cutting insert 2 of substantially triangular shape. The tool holder is formed with an insert receiving base member (or shim plate) 3 having an upper planar surface 4. Extending out of the base member 3 is a locating pin 5 anchored in the tool holder 1 and adapted to extend through a central bore 6 formed in the cutting insert 2 when the latter is, as shown in the drawings, located on the base member 3.

A clamping member 7 is juxtaposed with respect to the insert 2 so as to be supported by a support zone 8 of the tool holder. The support zone 8 comprises a first support surface 9 which is substantially parallel to the upper surface 4 of the base member 3. The support zone 8 furthermore comprises a wedging surface 10 which slopes downwardly into a recessed portion 11 and towards the base member 3. The recessed portion 11 is located between the base member 3 and the first surface 9.

The clamping member 7 has a rearwardly disposed, elongated heel portion 12 which slidably engages the first support surface 9 and a forwardly disposed nose portion 13 having a curved abutting surface 14 and an elongated tail portion 15.

The curved abutting surface 14 has a curvature substantially defined by the relationship $$R = C\phi$$

where R is the radius vector 16 (shown in broken line) measured between the heel portion 12 and any point on the abutting surface 14 whilst $\phi$ is the angle (in radians) between the radius vector and the first support surface 9.

A biasing screw 17 extends through a central bore 18 formed in the clamping member 7 (of such dimensions as to allow for limited lateral and rotational displacement of the clamping member 7 with respect to the screw 17) and into a threaded bore 18 formed in the tool holder 1.

As can be seen the heel portion 12 is in sliding engagement with the first support surface 9, the tail portion 14 is in abutting relationship with the wedge surface 10 and the curved abutting surface 14 is in clamping abutting relationship with an edge surface 19 of the insert 2 remote from its cutting corner 20.

In order to clamp the cutting insert 2, which has been located on the locating pin 5, the biasing screw 17 is tightened, thereby biasing the clamping member 7 towards the tool holder 1. As a result the heel portion 12 slides forwardly along the first support surface 9 and with the consequent downward displacement of the nose portion 13 into the recessed portion 11 the curved abutting surface 14 clampingly abuts the edge surface 19 of the insert 2 so as to clamp the insert 2 against the locating pin 5. In addition to the forward movement of the clamping member 7 towards the insert 2 the clamping member 7 also rotates about the heel portion 12 until it clampingly abuts the edge surface 19 of the insert 2.

In view of the particular curvature of the curved abutting surface 14 with respect to the heel portion 9 it is ensured that, irrespective of the limited degree of rotation of the clamping member 7 the abutting surface 14 abuts the edge surface 19 of the insert 2 at a substantially constant height above the upper surface 4 of the base member 3.

Thus, as can be seen in FIGS. 3 and 4 of the drawings with cutting inserts 2 of relatively differing widths, between the central bore 6 and the edge surface 19, depending on the range of manufacturing tolerance of the cutting insert 2, the clamping member 7 abuts the edge surface 19 at a relatively fixed constant height a above the surface 4 of the base member 3.

In this way it is ensured that cutting inserts within the entire range of manufacturing tolerances are subjected to substantially the same clamping forces and the clamping stability thereof remains substantially constant.

I claim:

1. A tool holder for a cutting insert comprising, an insert receiving base member; a locating pin projecting out of the base member so as to extend through a central bore formed in the insert when the latter is located on the base member; a clamping member juxtaposed with respect to the base member so as to be supported by a support zone of the tool holder; a first support surface of the support zone located substantially parallel to the base member; a second wedging surface of the support zone; as elongated recessed portion between the base member and the first surface and into which the wedging surface slopes towards the base member; a rearwardly disposed elongated heel portion of the clamping portion; a forwardly disposed nose portion of the clamping member; a curved abutting surface of the nose portion; an elongated tail portion formed integrally with the nose portion so as to project into the recessed portion in abutting relationship with the wedging surface; and screw biasing means located intermediate said heel portion and said nose portion for screw biasing the clamping member towards the support zone with the heel portion in sliding engagement with the first support surface, with the tail portion in abutting engagement with the wedging surface and with the curved abutting surface adapted to be in a clamping abutting engagement with an edge surface of the insert remote from a cutting portion thereof when the latter is located on the base member.

2. A tool holder according to claim 1 wherein said curved abutting surface has a curvature substantially defined by the relationship $R = C\phi$ where R is the radius vector measured between the heel portion and any point of the curved abutting surface, $\phi$ is the angle between the radius vector and said first support surface and C is a constant.

3. A tool holder according to claim 1 or 2 wherein said heel portion is constituted by a transverse ridge extending from an underside of said clamping member.

4. A tool holder according to claim 1 wherein said tail portion has a curved surface in abutting engagement with the wedging surface.

* * * * *